Jan. 1, 1929.

B. E. LENEHAN 1,697,192

FREQUENCY METER

Filed June 6, 1924 2 Sheets-Sheet 1

WITNESSES:
R. J. Butler.
E. R. Evans.

INVENTOR
Bernard E. Lenehan.
BY
Wesley G. Carr
ATTORNEY

Jan. 1, 1929.

B. E. LENEHAN 1,697,192

FREQUENCY METER

Filed June 6, 1924   2 Sheets-Sheet 2

WITNESSES:
R. J. Butler
E. R. Evans

INVENTOR
Bernard E. Lenehan.
BY
Wesley G. Carr
ATTORNEY

Patented Jan. 1, 1929.

1,697,192

UNITED STATES PATENT OFFICE.

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA.

FREQUENCY METER.

Application filed June 6, 1924. Serial No. 718,243.

My invention relates to instruments for indicating the frequency of alternating-current circuits and particularly to an instrument that is highly sensitive over a small range of frequency variation.

One object of my invention is to provide an instrument of this character wherein a large deflection is obtained upon a relatively slight change of frequency.

Another object of my invention is to provide a frequency meter having stationary and movable coils at right angles to each other, the current in the movable coil being substantially 90° out of phase with the current in the stationary coil at normal frequency, and means whereby the current in the movable coil is brought more nearly into phase with the current in the stationary coil when the frequency changes, so that a torque is exerted between the two coils.

A further object of my invention is to provide a frequency meter having a movable element comprising two coils secured together at right angles, each adapted to exert a torque with respect to a stationary field coil depending upon the frequency, so that the movable element takes a position of equilibrium without the use of restraining springs or the like.

Another object of my invention is to simplify the construction of the reactive devices employed in connection with frequency meters.

It is essential that a frequency meter indicate a comparatively slight variation in frequency from the normal value,—for instance, 1 or 2%. In accordance with my invention, this result is obtained by pivotally mounting a movable element in the field of a stationary coil, the movable element comprising two coils fixed together at right angles and arranged to exert opposing torques. At the normal frequency, one coil is parallel and the other is perpendicular to the stationary coil. The perpendicular coil carries a current 90° out of phase with the current in the stationary coil at the normal frequency, and accordingly there is no torque between the coils at this frequency. Upon a change of frequency, the current in the perpendicular coil changes in phase, thereby producing a torque that is operative to deflect the pointer. The torque exerted by the perpendicular coil is opposed by the torque between the stationary field coil and the parallel coil. The magnitude and phase relation of the currents in both the parallel and the perpendicular coils are adjusted as desired by the connection of series and shunt resistances and inductances. As the restraining torque is comparatively small, a large deflection is obtained for a slight change of frequency.

Further objects and advantages of my invention will become apparent from the following detailed description of the embodiment of my invention disclosed in the accompanying drawings in which Fig. 1 is a diagrammatic view of a frequency meter arranged in accordance with my invention;

Figure 1:
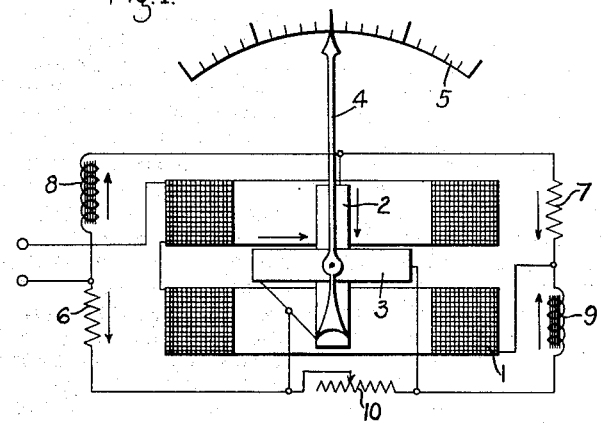

Referring to Fig. 1, the meter comprises a stationary coil 1, and a movable element comprising coils 2 and 3 at right angles to each other. The movable element carries a pointer 4 that co-operates with a scale 5 to indicate the frequencies measured by the instrument.

In series with the coils 2 and 3 are connected resistors 6 and 7 and reactances 8 and 9. A shunt resistor 10 is connected across the terminals of the coil 3 parallel to the stationary coil 1.

The resistors 6 and 7 and the reactances 8 and 9 are connected in bridge relation with the arms of the bridge alternately composed of each type of impedance. One terminal of the instrument is connected between the resistor 6 and the reactance 8. The stationary coil 1 is connected between the opposite junction of the bridge and the other terminal. The movable coil 2 is connected between the other junctions of the bridge. The movable coil 3 with its shunt resistor 10 is connected between the reactance 9 and the lower terminal of the coil 2 that is connected to the resistor 6. With these connections, it will be apparent that the phase relation and the magnitudes of the currents traversing the windings 1, 2 and 3 depend upon the relative impedance of the bridge elements and consequently upon the frequency of the applied voltage. The bridge elements are so selected that the currents traversing the coils 1 and 2 are 90° out of phase at the normal or average frequency.

Figure 2:
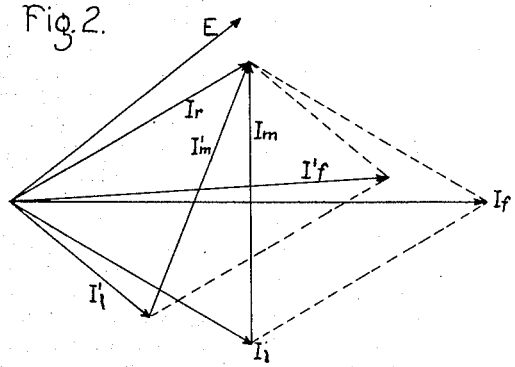
Fig. 2 is a vector diagram of the currents in the coils of the meter shown in Fig. 1.

Referring to Fig. 2, the current through the resistor 6, being nearly in phase with the applied voltage, is represented by the vector $I_r$. Assuming the directions shown in Fig. 1 for the current, this current flows upwardly in the coil 2 and through the resistor 7 and the stationary coil 1. The current through the reactances 8 and 9 is represented by $I_1$, which lags the applied voltage E nearly 90°. This current flows downwardly in the coil 2 and through the coil 3, the reactance 9 and the stationary coil 1 in series. The stationary coil 1, therefore, carries the sum of the currents $I_r$ and $I_1$, which is represented by the vector $I_f$, Fig. 2. The coil 2, on the other hand, carries the difference of the currents $I_r$ and $I_1$, which is represented by the vector $I_m$. The current in the coil 3 is approximately equal to $I_1$ but may be adjusted by the shunt resistor 10. Obviously, the resistor 10 may be omitted if the ampere-turns of the coil 3 is correct but, in actual practice, the resistor 10 is used to adjust the deflection of the instrument as it is easier to do this than to change the number of turns of the coil 3.

The torque between the windings 1 and 2 is a function of the current flowing in each of the windings and of the cosine of the electrical angle between the currents, as shown in Fig. 2. At normal frequency, the currents $I_f$ and $I_m$ through the fixed and movable coils 1 and 2 respectively, are substantially 90° out of phase and, since the cosine of 90° is zero, there is substantially no torque between the two coils.

When the frequency changes, however, the current $I_f$ changes, due to the fact that the reactance of the reactances 8 and 9 changes with the frequency. Thus, if the frequency increases, the reactance of the coils 8 and 9 increases, and $I_1$ becomes $I'_1$. $I_r$ remains practically unchanged, so that the sum and difference respectively of $I_r$ and $I'_1$ are represented by $I'_f$ and $I'_m$ respectively. Since $I'_f$, the current in the stationary coil 1, is no longer 90° out of phase with $I'_m$, the current in the coil 2, a torque is exerted between the two coils and the pointer 4 is deflected, thereby providing an indication of the change of frequency. It will be understood that as the frequency decreases from normal, the current $I_1$ increases so that the resultant currents in the coils 1 and 2 are more nearly in phase, and a torque is exerted between the two coils in the direction opposite to that in the case of frequencies above normal. Thus, an indication may be obtained of a relatively slight change of frequency from the normal value, for instance, 60 cycles.

Figure 3:
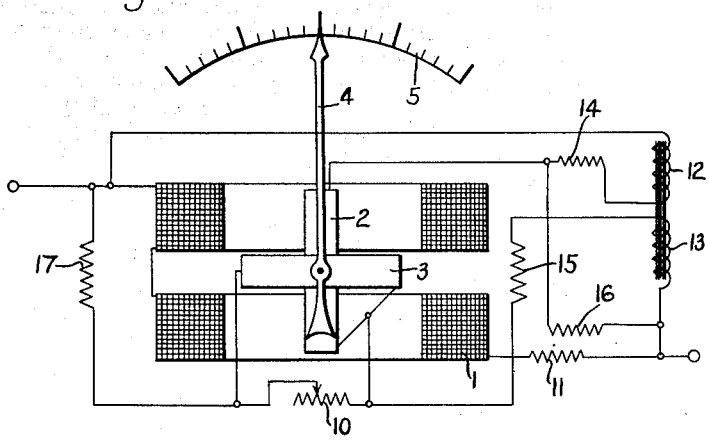
Fig. 3 is a diagrammatic view of a modification.

In Fig. 3 is shown a modification in which the two reactances are wound upon a single core, which results in considerable simplification of the structure. The meter comprises stationary and movable coils 1, 2 and 3 as before, but the stationary coil 1 is connected in series with a resistor 11 across the line terminals. Reactances 12 and 13, which may be wound upon the same core as shown, are each connected to one of the line terminals. The reactances 12 and 13, and resistors 14, 15, 16 and 17 are connected in series with the movable coils 2 and 3. The coil 3 is shunted by an adjusting resistor 10 as before.

One path for the current may be traced through the resistor 17, the coil 3, upwardly through the coil 2 and the resistor 16. Another path for the current may be traced through the reactance 12, resistor 14, downwardly through the coil 2, the resistor 15 and the reactance 13. The coil 2 carries the difference between these two currents and this resultant current is substantially 90° out of phase with the current through the stationary coil 1 at normal frequency. Upon a change of frequency, however, the phase of this resultant current changes so that a torque is exerted between the coils 1 and 2, the direction of the torque depending upon whether the frequency is greater or less than normal. The operation is similar to that of the meter shown in Fig. 1.

Figure 4:
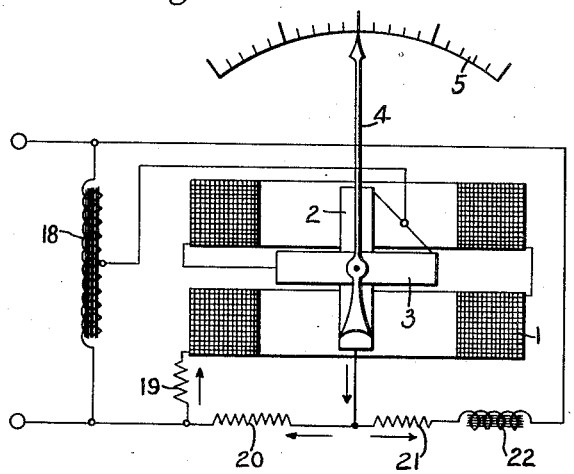
Fig. 4 is a similar view of another modification.

In Fig. 4 is shown a modified form of frequency meter in which an auto-transformer bridged across the line terminals is used. As shown, the meter comprises stationary and movable coils 1, 2 and 3 and a pointer 4 adapted to cooperate with a scale 5. The movable coils 2 and 3 are connected to the mid-point of a transformer 18 bridged across the line terminals. A resistance 19 is connected in series with the fixed coil 1 between one terminal of the instrument and the coil 3. Resistors 20 and 21 and a reactor 22 are connected in series across the line terminals. The resistance of the resistor 20 is twice that of the resistor 21, and the reactance of the reactor 22 in ohms is equal to the resistance of resistor 21 at normal frequency. The lower terminal of the coil 2 is connected between the resistors 20 and 21.

Figure 5:
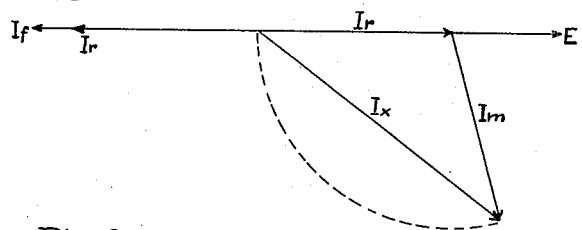
Fig. 5 is a vector diagram of the currents and voltages in the meter shown in Fig. 4.

The currents through the coils are represented by the vector diagram of Fig. 5, assuming the directions shown by the arrows in Fig. 4. If E is the applied voltage, the current through the fixed coil 1 and movable coil 3 is approximately 180° out of phase with this voltage and may be represented by $I_f$. The current $I_r$ through the resistor 20 is in phase with $I_f$ as shown. The current $I_x$, through the resistor 21 and reactor 22 lags the applied voltage approximately 45°. The current in the movable coil 2 is the difference between $-I_r$ and $I_x$ and is represented by $I_m$. Since $I_m$ is substantially 90° out of phase with $I_t$, the current through the stationary coil 1, substantially no torque is exerted between the coils 1 and 2 at normal frequency. As the frequency changes, however, $I_x$ varies, its locus being the circle described with $I_m$ as a radius. This circle diagram results from the stated values of the resistors 20 and 21 and the reactance 22, according to the well-known principle.

It will be noted, therefore, that as the frequency changes, the phase relation between $I_m$ and $I_t$ so changes that a torque is exerted between the stationary and the movable elements of the meter. As before, the direction of this torque depends upon whether the frequency is greater or less than normal, and, therefore, the pointer 4 is deflected in the one direction or the other when changes of frequency occur.

Figure 6:
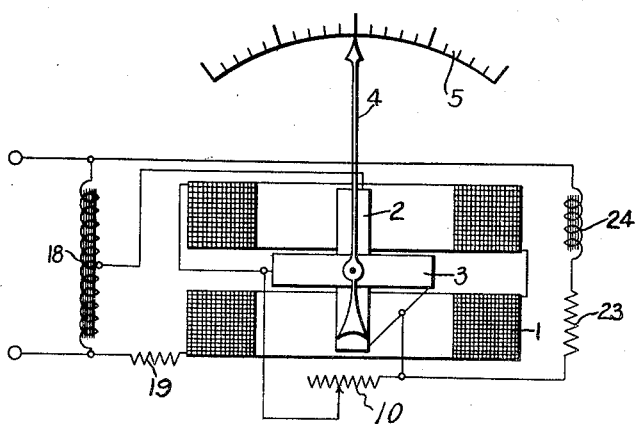
Fig. 6 is a diagrammatic view of another modification of my invention.

In Fig. 6 is shown a further modification of this type of meter in which the resistors 20 and 21 and the reactance 22 are replaced by a resistor 23 and a reactance 24. The meter comprises stationary and movable coils 1, 2 and 3 and a pointer 4 cooperating with a scale 5. The coil 2 is connected in series with a tap to the mid-point of the transformer 18 which is bridged across the line terminals. One path for the current through the meter may be traced through the reactance 24, the resistor 23 and upwardly through the coil 2 to the mid-point of the transformer 18. Another path may be traced through the resistor 19, the stationary coil 1, coil 3 and upwardly through the coil 2 to the mid-point of the transformer 18. It will be apparent that the coil 2, by reason of its connections to the transformer 18, the reactance 24 and the resistor 23, carries a current 90° out of phase with the fixed coil 1. When the frequency increases, the component of current through the reactance 24 decreases and the resultant current through the coil 2 changes so that a torque is exerted between the coils 1 and 2. Likewise, when the frequency decreases, the component of current through the reactance 24 increases, so that the phase of the current through the coil 2 changes in the opposite direction and an opposite torque is exerted between the coils 1 and 2.

It will be apparent that I have provided a frequency meter that will be sensitive to small variations of frequency and that may be readily adjusted to give a desired scale deflection.

I do not consider that my invention is restricted to the precise construction shown and described as various changes may be made within the spirit of the invention and I do not wish to be limited in scope, therefore, except as set forth in the appended claims.

I claim as my invention:

1. A frequency meter comprising two relatively movable elements, one of said elements comprising two coils at right angles to each other, and means comprising a non-resonant circuit including a reactance and a resistance both connected in series with one of said coils for causing a current to flow through said coil that is 90° out of phase with the current through the other of said elements at substantially the average frequency measured.

2. A frequency meter comprising two relatively movable elements, one of said elements comprising two coils at right angles to each other, means comprising a non-resonant circuit including a reactance and a resistance bolt connected in series with one of said coils to cause a current to flow through said coil that is 90° out of phase with the current through the other of said elements at substantially the average frequency measured, and means for causing a relative phase displacement of said currents upon a change of frequency.

3. A frequency meter comprising a stationary coil, two movable coils secured together at an angle to each other, and non-resonant impedance means in the circuits of one of said movable coils and said stationary coil for causing the current in said movable coil to be 90° out of phase with the current in the stationary coil at only the average value of frequency measured.

4. A frequency meter comprising a stationary coil, two movable coils secured together at an angle to each other, non-resonant impedance means in the circuits of one of said movable coils and said stationary coil for causing the current in said movable coil to be 90° out of phase with the current in the stationary coil at substantially the average value of frequency measured, and means connected to the other of said movable coils for adjusting the deflection of the instrument.

5. A frequency meter comprising a stationary coil, two movable coils secured together at an angle to each other, non-resonant impedance means in the circuits of one of said movable coils and said stationary coils for causing the current in said movable coil to be 90° out of phase with the current in the stationary coil at substantially the average value of frequency measured, and a shunt resistor connected to the terminals of the other of said movable coils for adjusting the deflection of the instrument.

6. A frequency meter comprising a stationary coil, two movable coils having their axes parallel to and perpendicular to the axis of the stationary coil respectively, resistance and reactance connected in series with said perpendicular coil, part of said resistance being also connected in series with said parallel coil.

7. A frequency meter comprising a stationary coil, two angularly displaced movable coils secured together, means whereby one of said movable coils always carries such current that a torque is exerted tending to move the coil parallel to the stationary coil, and means including a non-resonant impedance common to the circuits of the other of said movable coils and of the stationary coil whereby said other coil exerts a clockwise, counter-clockwise or zero torque depending upon the frequency of the applied electromotive force.

8. A frequency meter comprising a stationary coil, two angularly displaced movable coils secured together, means whereby one of said movable coils always carries such current that a torque is exerted tending to move the coil parallel to the stationary coil, and means including a non-resonant impedance element common to the circuits of a plurality of said coils whereby the other of said movable coils exerts a clockwise, counter-clockwise, or zero torque depending upon the frequency.

9. A frequency meter comprising a plurality of coils, an impedance network including two reactances connected to said coils, said reactances being wound upon a common core and means including said impedance network for subjecting two of said coils to currents that are 90° out of phase at a predetermined frequency of the applied electromotive force.

10. A frequency indicator comprising relatively movable elements, one of said elements having two windings inductively related to the other element, means comprising a non-resonant circuit including a resistor and a reactance in series-circuit relation with each of said windings for limiting the current therein in accordance with frequency, and indicating means actuated by the movable element.

11. A frequency indicator comprising relatively movable elements, one of said elements having two windings inductively related to the other element, means including a non-resonant reactance circuit in series relation with each of said winding for directly controlling the value of current therein in accordance with frequency, and indicating means actuated by the movable element.

12. The combination with a stationary coil and a plurality of movable coils in fixed space relationship with respect to each other, of means for varying the position of the movable coils in accordance with the frequency of an alternating electrical current, comprising reactances and resistances in non-resonant circuit relation with said movable and stationary coils.

In testimony whereof, I have hereunto subscribed my name this 27th day of May, 1924.

BERNARD E. LENEHAN.